June 4, 1946.   J. MIHALYI   2,401,703
PRISM ADJUSTING AND POSITIONING MECHANISM
Filed March 6, 1943
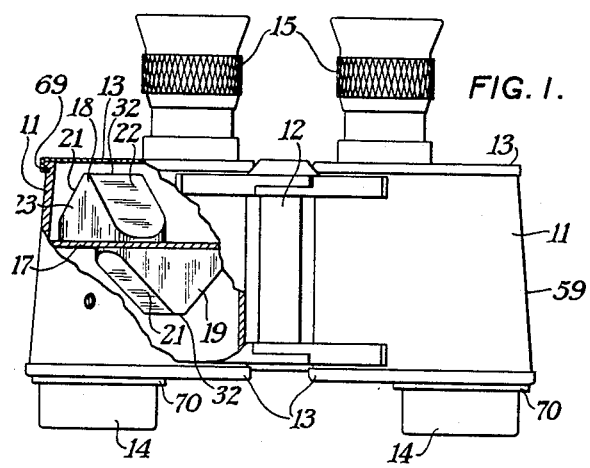
FIG. 1.
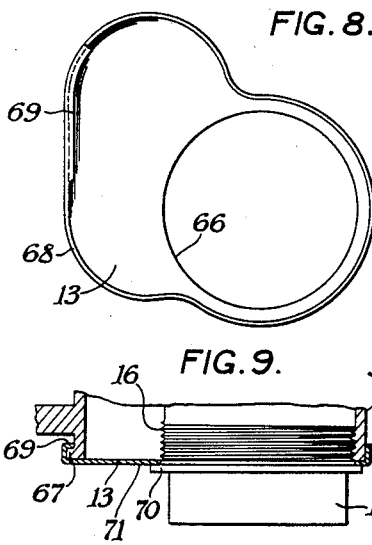
FIG. 8.
FIG. 9.
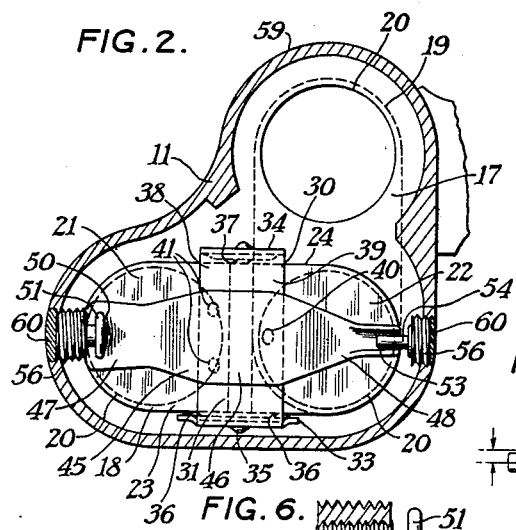
FIG. 2.
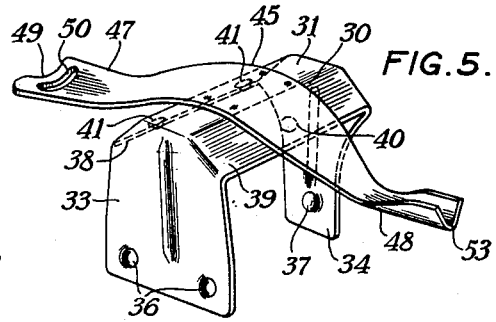
FIG. 5.
FIG. 7.
FIG. 6.
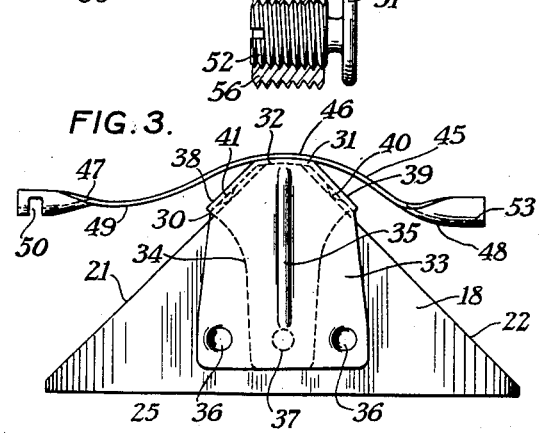
FIG. 3.
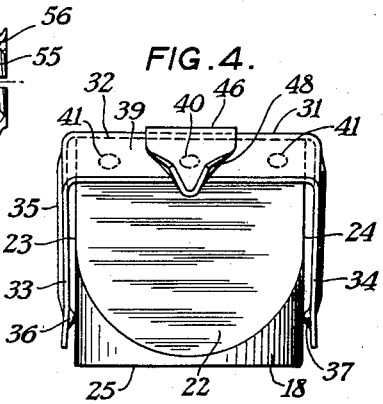
FIG. 4.
JOSEPH MIHALYI
INVENTOR
BY Newton M Perrin
J. Griffin Little
ATTORNEYS Patented June 4, 1946

2,401,703

UNITED STATES PATENT OFFICE 2,401,703

PRISM ADJUSTING AND POSITIONING MECHANISM

Joseph Mihalyi, Rochester, N. Y., assignor to Eastman Kodak Company, Rochester, N. Y., a corporation of New Jersey Application March 6, 1943, Serial No. 478,247

13 Claims. (Cl. 88—33)

The present invention relates to optical instruments, and more particularly to binoculars in which reflecting prisms are employed for reflecting the image from the objective to the eyepiece.

In instruments of this type it is imperative that the reflecting prisms be properly adjusted relative to each other, as well as to the optical and mechanical axes of the binoculars. To properly adjust each prism, the latter is moved longitudinally of the support or seat to collimate the optical axis with the mechanical axis of the instrument. The prism is then moved laterally to square up the image, all of which is well known to those in the art. After the prisms have been finally adjusted, they are retained in adjusted position by suitable means which firmly hold the prisms on their seats. Such prism adjustment or positioning is usually performed at the factory, and requires skilled help and suitable calibrating devices.

Prism adjusting devices are usually in the form of screws or threaded members which serve to move the prism. After the proper adjustment has been secured, the adjusting screws are upset or riveted over to prevent movement of the screws to thus insure that the adjustment will be maintained. Such a method of adjustment will provide a substantially permanent positioning of the prism. As well known, however, prisms may become coated with moisture or some foreign substance which will fog or obstruct vision through the prism, the disadvantages of which will be readily apparent. In order to clean the prisms, the latter must be removed from the supporting casing. Such removal will utterly destroy or alter the adjustment of the mechanism or screws so that it will not be possible to replace the prisms without again properly adjusting the latter. The result is that the binoculars usually must be returned to the factory or to some suitable distant point which is properly equipped to correctly adjust the prisms. In all cases, however, trained personnel and suitable calibrating devices are required. It will be apparent that when such binoculars are used for military purposes, such personnel and equipment are not usually available, and unclean prisms may render the binoculars unfit for use, the disadvantages of which are obvious.

It is highly desirable, therefore, to provide a prism adjusting mechanism which is so constructed as to provide the proper positioning of the prisms, yet which permits the latter to be removed readily and easily for cleaning or replacement, without altering the positions of the adjusting device. With such an arrangement, the prisms could be removed, cleaned and replaced by a person unskilled in prism adjustment, and when so replaced will be automatically positioned by the originally adjusted positioning means to accurately align the prisms without necessitating the use of skilled labor or specialized calibrating devices. A prism positioning means of this type would enable Army or Navy personnel to readily and easily remove a fogged or blurred prism, and replace the latter on its seat and in cooperative relation with the adjusting device with the assurance that the clean prism will be properly positioned. Such a structure, particularly for military use, will be of the greatest benefit.

The applicant is aware of only one form of binocular construction in which the prisms are mounted so as to permit ready and easy removal and replacement of the prisms without destroying or altering the prism adjusting means. This construction is relatively expensive and requires a precise and accurately made prism which slips into and is positioned in a carefully and accurately machined seat in the prism support. The seat is of such size, shape and location as to just receive the prism to accurately position the latter. Suitable means is provided for maintaining the prism in position in the seat. While such a construction permits removal of the prism, very accurate and precisely made prisms are required, and a carefully machined and costly seat must be formed to receive the prism. This arrangement is to be compared with the structure of the present invention in which the prism may be a production product and not a precision piece. All that is necessary is that the angles of the prism be fairly accurate. Furthermore, only a flat support or seat is required, thus eliminating expensive time consuming machining. Such a flat seat may be formed by die-casting or molding the seat with the prism casing or housing.

The present invention has, therefore, as its principal object, a prism positioning and holding means which not only positively positions the prism, but also retains the latter in its adjusted position.

A further object of the invention is the provision of a prism positioning and holding means, parts of which are detachable or separable to permit the ready and easy removal and replacement of the prism without in any way moving or altering the adustment mechanism so that when the prism is replaced it will be properly positioned.

Yet another object of the invention is the provision of a separate holding and positioning means which will maintain the prism in adjustment even under sharp and severe impacts to which binoculars are subjected during final inspection or actual use.

Still another object of the invention is the provision of a prism holding means which not only enables the prism to be removed and accurately replaced, but also does not require accurate and costly machining of the prism supporting means or a precision-made prism.

And another object of the invention is the provision of a prism positioning and holding means which is detachable, simple in construction, substantially rigid, inexpensive to manufacture, and highly effective in use.

To these and other ends, the invention resides in certain improvements and combinations of parts, all as will be hereinafter more fully described, the novel features being pointed out in the claims at the end of the specification.

In the drawing:

Fig. 1 is a plan view of a binocular with parts broken away to show the arrangement of the reflecting prism, but for the purpose of clarity the prism adjusting and positioning device has been omitted in this view;

Fig. 2 is an end view of one of the viewing tubes or casings illustrated in Fig. 1 with the end plate or closing member removed, showing a prism adjusting and positioning mechanism constructed in accordance with the present invention.

Fig. 3 is a side elevation view of the prism and holder therefor, removed from the binocular, showing a portion of the means for detachably connecting the prism to the tubular casing or viewing tube;

Fig. 4 is an end view of the structure illustrated in Fig. 3;

Fig. 5 is a perspective view of the prism holder and the yieldable member by which the holder may be detachably connected to the binocular casing;

Fig. 6 is a sectional view through the concentric adjusting pin by which the prism may be moved longitudinally of the seat for the purpose of collimation;

Fig. 7 is a sectional view through the eccentric pin by which the prism may be moved laterally of the seat for the purpose of squaring up the images;

Fig. 8 is a plan view of a casing closure member constructed in accordance with the present invention; and Fig. 9 is a sectional view through an end only of one of the binocular casings, showing the arrangement for retaining the closure member in position without the use of screws or similar fastening means.

Similar reference numerals throughout the various views indicate the same parts.

The drawing shows binoculars having a pair of tubular members or casings 11 which are suitably connected for movement about a central axis 12. The opposite ends of the casing 11 are closed by plates or closure members 13, to be later more fully described, and through which the objectives 14 or the eye-pieces 15 extend to engage threads 16 formed on the inner surface of the casing, as shown in Fig. 9. Each casing 11 has formed therein a flat support or seat 17, the opposite sides of which support the prisms 18 and 19 which are positioned in a well-known manner to reflect the image between the objective 14 and the eye-piece 15. The support 17 may be formed by die casting or molding integrally with the casing 11, and is provided with three openings 20 arranged in alignment with the angularly arranged or sloping reflecting faces 21 and 22 of the prisms 18 and 19, the faces 21 and 22 being connected by straight sides 23 and 24. The base or hypotenuse 25 of each prism rests on and is firmly held in position on the seat or support 17, in a manner to be later described. As the holding and positioning means for each of the prisms is identical, only one of them will be described.

A very rigid inverted U-shaped holder, generally indicated by the numeral 30, slidably engages each prism in the manner shown in Figs. 3 and 4 and to be later more fully described. This holder is formed from a single piece of rigid material, such for example, as heavy sheet metal to provide a cross-member or portion 31 arranged to extend transversely of the prism and in close proximity to the corner 32 opposite the base 25, as best shown in Fig. 3. A pair of extending members or sections 33 and 34 extend downwardly from the cross-piece 31 and lie adjacent the sides 23 and 24 of the prism, as shown in Fig. 4. The member 33 is relatively wide and is supplied with a reinforcing rib 35 to provide a substantially rigid member. The member 34, on the other hand, is somewhat narrower than the member 33, as shown in Fig. 5, so as to be slightly yieldable to permit the easy slipping of the holder 30 over the prism. The member 33 is formed with a pair of inwardly extending nibs or protuberances 36 adapted to engage the side 23 of the prism, while the member 34 has a single nib 37 arranged to engage the face 24 of the prism, all as best shown in Figs. 4 and 5. The nibs 36 and 37 thus provide a three-point engagement of the holder 30 with the opposite sides 23 and 24 of the prism. A pair of angularly arranged wings or members 38 and 39 are integrally formed with and projected from opposite sides of the cross-piece 31 and overlie the sloping or angularly arranged reflecting faces 21 and 22 adjacent to the corner 32. One of these wings is provided with a single inwardly projecting nib 40 while the other wing is provided with a pair of projection nibs 41. These nibs 40 and 41 are positioned to engage the angularly arranged reflecting faces or surfaces of the prisms, as shown in Fig. 3, to provide three-point contact of the members 38 and 39 therewith.

The above-described holder 30 is substantially rigid and securely clamps the prism in a manner shown in Figs. 3 and 4. A strip of metal or similar yieldable or flexible material 45 of the shape best shown in Figs. 3 and 5 is suitably connected at its central portion 46 to the cross-piece 31 to provide a pair of projecting slightly resilient arms 47 and 48 by which the holder 30 may be detachably connected to the casing 11 in a manner to be later described. The arm 47 has its free end slightly curved, as shown at 49, and formed with a slot 50 adapted to receive the rounded pin 51 of a concentric adjustable member 52 movably or threadably mounted in one side of the casing 11. The arm 48, on the other hand, has the free end bent to form a U-shaped slot or groove 53 adapted to slidably receive a pin 54 eccentrically mounted on a screw or member 55 mounted in the opposite side of the casing 11 and in substantial alignment with the member 52. The movable members 52 and 55 are separately axially movable or threadably positioned in fixed bushings 56 secured to the opposite side of the casing 11. Such bushings are desirable due to the fact that the casing 11, usually made of aluminum, or similar other metal, does not provide a strong anchorage for the adjusting members 52 and 55. As the member 45 with its flexible arms 47 and 48 are secured to or formed integral with the holder 30, the member 45 may be broadly considered as a part of the holder, and the holder may be broadly considered as both adjustably and detachably connected to the casing 11.

When the holder and prism are in position, the arm 47 is positioned under the member 52 so that the head 51 thereof projects into the slot 50 while the arm 48 is positioned under the member 55 so that the groove 53 receives the eccentric pin 54 with the latter pressing downwardly against the bottom of the groove. Such engagement of the yieldable member 45 with the pins 51 and 54 serves to flex or bend the arms 47 and 48 downwardly and firmly press the base 25 of the prism against the seat or support 17 to retain the prism in position thereon. The pin-and-slot connections 50 and 51 provide a pivoted connection between the member 52 and the arm 47, while the slot and pin connections 53 and 54 provide a slidable connection between the arms 48 and the member 55, the purposes of which constructions will be presently described.

In order to properly adjust the prism, the latter must be moved in two directions; one, longitudinally of the base 25 to collimate or align the axis of the prism with the mechanical axis of the instrument; and, second, transversely of said base to properly square up the images, all of which is well known to those in the art. The longitudinal movement is secured by screwing the member 52 in or out to cause the pin-and-slot connections 50 and 51 to move the member 45 and the holder 30 to slide the prism to the right or left on the support 17, as viewed in Figs. 2 and 3. The movement of the holder is transmitted to the prism through the nibs 40 and 41 of the wings 38 and 39. During this adjustment, the pin 54 slides in the groove 53. After this longitudinal adjustment has been properly made, the screw 55 is then rotated to rotate the eccentric pin 54. Such movement causes the member 45 to pivot about the pin 51 to move the prism laterally or up and down on the support 17, as viewed in Fig. 2.

The pins 51 and 54 thus provide the necessary longitudinal and transverse adjustment necessary to properly position the prism. This adjustment is, however, a factory adjustment and is performed by means of skilled personnel and with proper calibrating instruments. Once, however, the adjustment is made it is substantially permanent, at least as far as the user is concerned. In order to prevent tampering with the setting of the adjustment screws 52 and 55, the outer ends of the bushings 56 are preferably countersunk, as shown in Fig. 2, below the outer surface 59 of the casing 11. The countersunk opening may then be filled with a suitable material 60 to prevent access to the screws 52 and 55, thus insuring that the latter will be maintained in the original position of adjustment.

The prisms are thus each separately adjusted in position and finally held on the support or seat by reason of the yieldable pressure exerted by the arms 47 and 48 of the member 45. As is well known, the prisms, and particularly the reflecting surfaces 21 and 22 may accumulate dust, moisture, or other substances which may materially affect the light-transmitting power of the prisms. It is highly desirable, therefore, to provide an arrangement by which the prisms may be separately adjusted and positioned and held in the position after being so adjusted, yet permitting easy removal of each prism for cleaning, and the replacing of the prism in its original position without necessitating adjusting or altering of the screws 52 and 55.

The above-described structure is admirably adapted for the ready and easy removal and replacement of the prisms. As will be apparent from the drawing, the flexible arms 47 and 48 provide a detachable or releasable connection with the pins 51 and 54 whereby the member 45, as well as the holder 30 of the prism, may be disconnected from the adjusting pins 51 and 54 without changing the positions thereof. To secure such a release, all that is necessary is to flex the free end of the arm 47 downwardly to disengage the pin 51 out of the slot 50. The member 45 may then be moved laterally to move the slot 50 out of registration with the pin 51. As one end of the member 45 is now free, the arm 48 may be readily disconnected from the eccentric pin 54 to completely disconnect the holder from the casing. The holder and prisms may then be lifted out of the casing 11 and the holder detached, as shown in Fig. 5. The prism surfaces may now be cleaned, after which the holder may be assembled on its prism, as shown in Figs. 2, 3, and 4. The prism and holder assembly are then placed in the casing, with the base 25 of the prism resting on the support 17. The arm 48 is now pressed downwardly to engage the eccentric pin 54 in groove 53, after which the arm 47 is pressed downwardly to bring the slot 50 in registry with the pin 51. Upon release of the arm 48, the pin 51 engages the slot 50. As the original adjustments of the pins 51 and 54 have not been disturbed, the reengagement of the arms 47 and 48 therewith will automatically and positively move the prism to its proper position.

Thus by means of such a detachable connection, the prism may be easily and quickly removed, cleaned, and replaced in the proper position even by an unskilled person and without the use of specialized calibrating equipment. The advantages of such a structure, particularly for military use, are readily apparent and such cleaning may be readily and easily accomplished by the Army while in the field or by the Navy when at sea at which time the user is not in a position to avail himself of skilled help and/or specialized calibrating equipment.

The opposite ends of the casing 11 are closed by plates or closing members 13 of the shape best shown in Fig. 8. Each of these plates is supplied with a suitable shape and size aperture 66 to permit the eye-piece 15 or the objective 14 to pass therethrough and into engagement with threads 16 formed on the inner surface of the casing 11, as shown in Fig. 8. In prior constructions such closure members were held in place by screws extending through the plate and into threaded openings formed in lugs or bosses formed on the inner surface of the casing 11. Such an arrangement not only necessitates the forming of the screws and tapped holes, but also the operation of properly placing and screwing down such screws. It has been found in production that such screws are often improperly applied and the threads of the tapped holes may be stripped. This then requires the retapping of the holes and the use of oversize screws. Such an arrangement also affords another possible source of dust and chips which may find their way inside the casing and onto the prism surfaces.

To overcome these difficulties, and to expedite and facilitate the placing of the closure members 13 in position and securing them to the casing 11, the latter is provided with a radially extending ridge or rib 67 formed on the outer surface 59 of the casing 11 and spaced from the eye-piece or objective and of the shape best shown in Figs. 8 and 9. The closure member 13 is formed with a marginal rim 68 arranged to overlie the outer surface 59 of the casing 11, as shown at the right of Fig. 9. A portion of this rim adjacent to the ridge 67 is bent inwardly as shown at 69 to provide a flange which slides behind the ridge 67, as clearly shown at the left of Fig. 9. When the closure member is placed in position, the flange 69 is first engaged behind the ridge or rim 67, the closure member is then moved to the position as shown in Fig. 9 to close the end of the casing. The eye-piece or objective is then passed through the aperture 66 to engage the threads 16 formed in the casing, as shown in Fig. 9. As the eye-piece or objective is screwed in, a flange or rim 70 thereon engages the outer surface 71 of the member 13 and cooperates with the ridge 67 and flange 69 to securely retain the closure member in position without the use of screws or similar securing means. When the closure member is removed to gain access to the prism, the eye-piece or objective is first unscrewed to move the flange 70 away from the surface 71, then by slightly tipping the closure member about the flange 69, the latter may be disengaged from behind the rim or ridge 67. By means of this arrangement, the closure members 13 may be readily and quickly secured to or detached from the casing 11, and the undesirable results incident to the use of holding screws are thereby eliminated.

From the above description, it is apparent that the present invention provides a prism holding means which firmly retains the prism on its seat and which may be properly moved to secure the necessary prism adjustments. Furthermore, the prism holding means may be readily and easily detached from its adjusting means without necessitating alteration or movement of the latter. The result is that the prism may be removed, cleaned, and restored to its original position of adjustment without requiring the use of skilled labor or specialized calibrating devices. In addition, the casing closure members are held in place without the use of screws or other similar fastening means.

While one embodiment of the invention has been disclosed, it is to be understood that the inventive idea may be carried out in a number of ways. This application is, therefore, not to be limited to the precise details described but is intended to cover all variations and modifications thereof falling within the scope of the appended claims.

I claim:

1. In an optical instrument, the combination with a casing, a prism seat formed in said casing, a prism supported on said seat and having angularly arranged faces and opposite sides, of a substantially rigid prism holder comprising a portion extending over the corner of said prism opposite said base and engaging said faces, sections connected to and depending from said portion and engaging said sides and cooperating with said portion to hold said prism, a yieldable member connected to said portion, and means on said casing releasably engageable with said member to hold said prism firmly on said seat and to detachably connect said holder to said casing without necessitating any alteration of said means or said casing.

2. In an optical instrument, the combination with a casing, a prism seat formed in said casing, a prism supported on said seat and having angularly arranged faces and straight opposite sides, of a substantially rigid holder comprising a portion bridging the corner of said prism opposite said base and engaging said faces adjacent to said corner, a rigid leg secured to and depending from said portion and engaging one of said sides, a slightly flexible leg secured to said portion and depending therefrom and engaging said other side, a yieldable member secured to said portion at said corner and extending toward said casing, a pair of aligned pins mounted in said casing, and seats formed in the ends of said member and arranged to receive said pins to hold said prism firmly on said seat and to detachably connect said holder to said casing.

3. In an optical instrument, the combination with a casing, a prism seat formed in said casing, a prism supported on said seat and having angularly arranged faces and straight opposite sides, of an inverted U-shaped substantially rigid prism holder having a portion extending over the corner of said prism opposite said base and sections depending from said portion and engaging said sides, and a pair of angularly arranged members projecting from the opposite sides of said portion and engaging said faces adjacent to said corner, a yieldable member connected to said portion and extending toward the opposite sides of said casing, aligned pins positioned in said opposite sides, and pin receiving seats formed in the ends of said yieldable member to releasably receive said pins to hold said prism firmly on said seat and to detachably connect said holder to said casing to permit removal of said prism.

4. In an optical instrument, the combination with a casing, a prism seat formed in said casing, a prism positioned on said seat, of a holder for said prism, a pair of prism adjusting members mounted in said casing, a yieldable member carried by said holder and engageable with said members to maintain said prism in position on said seat, said member being movable in said casing to adjust said prism on said seat, and a disengageable connection between said yieldable member and said adjustable members to permit detachment of said holder from and re-engagement of said holder with said adjustable members without altering the positions of the latter.

5. In an optical instrument, the combination with a casing, a prism seat formed in said casing, a prism adjustably positioned on said seat, of a holder for said prism, a concentric pin carried by said casing, means for connecting said holder to said pin so that movement of the latter will move said prism longitudinally of said seat, a rotatable eccentric pin carried by said casing, and means for connecting said holder to said eccentric pin so that rotation of the latter will move said prism laterally of said seat, said pins and connecting means providing a releasable connection between said pins and holder whereby the latter may be detached from or connected to said pins without altering the adjustments of the latter.

6. In an optical instrument, the combination with a casing, a prism seat formed in said casing, a prism adjustably positioned on said seat, of a holder for said prism, a concentric pin movably mounted in said casing, an eccentric pin movably mounted in said casing and arranged in substantial alignment with said concentric pin, a yieldable member on said holder, seats formed on said member and engageable with said pins to detachably connect said holder to said casing to hold said prism firmly on said seat, the movement of said concentric pin relative to said casing serving to move said holder relative to said eccentric pin to shift said prism longitudinally on said seat and the rotation of said eccentric pin pivoting said holder about said concentric pin to shift said prism laterally on said seat.

7. In an optical instrument, the combination with a casing, a prism seat formed in said casing, a prism positioned in said seat and formed with angularly arranged faces and opposite sides, of a substantially rigid prism holder having portions engaging said faces and sides to retain said prism positively in position on said seat, a yieldable member carried by said holder, an axially movable pin carried by said casing, a rotatable eccentric pin mounted in said casing in substantial alignment with said first pin, and seats formed on the ends of said yieldable member to detachably connect said holder thereto to hold said prism firmly on said seat, the axial movement of said first pin moving said holder and prism longitudinally of said seat while the rotation of said eccentric pin moves said holder and prism laterally of said seat to accurately position said prism, said seats and pins providing a releasable connection by which the holder and prism may be disconnected from said pins or connected thereto without necessitating any altering of the positions of the pins.

8. In an optical instrument, the combination with casing, a prism seat formed in said casing, a prism adjustably positioned on said seat, of a holder for said prism, a concentric pin adjustably mounted in said casing, means for pivotally connecting said holder to said pin, an eccentric pin adjustably mounted in said casing, and a sliding connection between said holder and said eccentric pins, the adjustment of said concentric pin moving said holder along said eccentric pin to adjust said prism longitudinally of said seat while the adjustment of said eccentric pin pivots said holder on said concentric pin to adjust said prism laterally of said seat, said connections also providing means by which said holder is detachably connected to said casing to permit the removal and replacement of said holder and prism without altering the positions of said pins.

9. In an optical instrument, the combination with a casing, an optical member threadedly engaging one end of said casing, of a member for closing said end of said casing and formed with an aperture through which said optical member extends to engage said casing, a ridge formed on said casing adjacent said end, a flange on said closure member positioned to engage said ridge, and a rim on said optical member arranged to engage said closure member and cooperating with ridge and flange to retain said closure member in position on said casing.

10. In an optical instrument, the combination with a tubular member adapted to house optical members, a lens mount threadedly engaging one end of said tubular member, said end being substantially larger than said mount, of a plate arranged to close said one end of the tubular member and formed with an aperture through which said mount extends to engage said tubular member, a laterally extending ridge formed on said tubular member adjacent said end and spaced from said mount, a flange formed on said plate and arranged to engage behind said ridge, and a rim on said optical member adapted to engage said plate to move the latter to engage said end and cooperating with said ridge and flange to hold said plate in closing relation with said tubular member.

11. In an optical instrument, the combination with a casing, a prism seat formed in said casing, a prism supported on said seat and having angularly arranged faces and opposite sides, of a substantially rigid holder formed with portions engaging said faces and sides, a yieldable member connected to said holder, and prism adjusting means on said casing comprising a pair of movable spring engaging members for releasably engaging the opposite ends of said member to hold said prism firmly on said seat and to provide a releasable connection between said member and said means by flexing the yieldable member away from said prism adjusting means to permit the disconnecting of said member without altering the position of said means.

12. In an optical instrument, the combination with a casing, a prism seat formed in said casing, a prism positioned on said seat, of a substantially rigid holder for said prism, a yieldable member connected to said holder, a pair of adjustable aligned positioning pins mounted in said casing, and seats formed in the ends of said member for receiving said pins to position and hold said prism firmly on said seat and to provide a releasable connection by flexing the yieldable member away from the pins, by which said member may be disconnected from said pins without altering the position of the latter.

13. In an optical instrument, the combination with a casing, a prism seat formed in said casing, a prism positioned on said seat, of a holder for said prism, adjustable members carried by said casing, and a yieldable member on said holder engageable with said members so that movement of said members will adjust said prism on said seat, said adjustable and yieldable members providing a disengageable connection by flexing said yieldable members away from said adjustable members, to disconnect the yieldable members from said adjustable members without changing the positions of said adjusting members.

JOSEPH MIHALYI.